(12) United States Patent
Albach et al.

(10) Patent No.: US 9,415,572 B2
(45) Date of Patent: Aug. 16, 2016

(54) COMPOSITE ELEMENTS COMPOSED FROM THERMOPLASTIC POLYMERS AND POLYURETHANES, AND PROCESS FOR PRODUCTION THEREOF

(75) Inventors: Rolf Albach, Köln (DE); Hartmut Nefzger, Pulheim (DE); Petra Venner, Leverkusen (DE); Monika Haselbach, Köln (DE)

(73) Assignee: Covestro Deutschland AG, Leverkusen (DE)

( * ) Notice: Subject to any disclaimer, the term of this patent is extended or adjusted under 35 U.S.C. 154(b) by 247 days.

(21) Appl. No.: 14/235,662

(22) PCT Filed: Jul. 25, 2012

(86) PCT No.: PCT/EP2012/064625
§ 371 (c)(1),
(2), (4) Date: Jun. 9, 2014

(87) PCT Pub. No.: WO2013/017509
PCT Pub. Date: Feb. 7, 2013

(65) Prior Publication Data
US 2014/0322544 A1    Oct. 30, 2014

(30) Foreign Application Priority Data

Jul. 29, 2011 (DE) .......... 10 2011 080 134

(51) Int. Cl.
| | | |
|---|---|---|
| *B32B 27/40* | (2006.01) | |
| *B32B 37/14* | (2006.01) | |
| *C08G 18/40* | (2006.01) | |
| *C08G 18/42* | (2006.01) | |

(52) U.S. Cl.
CPC .............. *B32B 27/40* (2013.01); *B32B 37/144* (2013.01); *C08G 18/4018* (2013.01); *C08G 18/4238* (2013.01); *C08G 18/4241* (2013.01); *Y10T 156/10* (2015.01); *Y10T 428/31551* (2015.04)

(58) Field of Classification Search
CPC .......... C08G 18/4018; C08G 18/4238; C08G 18/4241; B32B 27/40; B32B 37/144; Y10T 428/31551; Y10T 156/10; B05D 1/00
USPC .......... 428/423.3, 423.7, 424.6, 424.7, 424.8; 156/60
See application file for complete search history.

(56) References Cited

U.S. PATENT DOCUMENTS

| | | | | |
|---|---|---|---|---|
| 4,996,103 | A | * | 2/1991 | Henn et al. ................. 428/305.5 |
| 5,672,636 | A | * | 9/1997 | Horn et al. ................... 521/167 |
| 6,054,208 | A | * | 4/2000 | Rega et al. ................... 428/323 |
| 6,107,355 | A |   | 8/2000 | Horn et al. |
| 6,346,558 | B1 | * | 2/2002 | Peters et al. ................. 521/114 |
| 2011/0250429 | A1 |   | 10/2011 | Renner et al. |

FOREIGN PATENT DOCUMENTS

| | | |
|---|---|---|
| DE | 19928608 A1 | 12/2000 |
| DE | 10022276 A1 | 11/2001 |
| DE | 10022280 A1 | 11/2001 |
| EP | 1063249 A2 | 12/2000 |
| WO | WO-2010072572 A3 | 7/2010 |

OTHER PUBLICATIONS

International Search Report for PCT/EP2012/064625 mailed Nov. 8, 2012.
Rule 56—Search Report for German priority document DE 10 2011 080 134.0.

* cited by examiner

*Primary Examiner* — Thao T Tran
(74) *Attorney, Agent, or Firm* — Drinker Biddle & Reath LLP

(57) ABSTRACT

The invention relates to composite elements comprising a thermoplastic polymer and an adjacent polyurethane bonded thereto, to a process for production thereof and to the use thereof.

10 Claims, No Drawings

COMPOSITE ELEMENTS COMPOSED FROM THERMOPLASTIC POLYMERS AND POLYURETHANES, AND PROCESS FOR PRODUCTION THEREOF

CROSS-REFERENCE TO RELATED APPLICATIONS

This application is a national stage application (under 35 U.S.C. §371) of PCT/EP2012/064625, filed Jul. 25, 2012, which claims benefit of German application 10 2011 080 134.0, filed Jul. 29, 2011.

The invention relates to composite elements which comprise a thermoplastic and polyurethane adhering thereto, to a process for production of these, and to their use.

Polyisocyanate polyaddition products obtainable by reaction of isocyanates with compounds reactive toward isocyanates are well known, as also are composite elements involving these products with other plastics. Exposure of these composite elements to mechanical load often leads to undesired separation of the plastics from the polyisocyanate polyaddition products. This type of loading cannot be excluded during the use of said composite elements in automobile construction, and separation of the polyisocyanate polyaddition products from the other plastics with the resultant destruction of the composite element is particularly unacceptable here.

WO 2010/072572 describes composite elements made of plastic with a polyisocyanate polyaddition product (PUR) adhering thereto, where the PUR formulation comprises a polyester polyalcohol functioning as adhesion promoter. The polyester polyalcohol can be produced by polycondensation of an acid component and one or more diols, where the acid component is composed of from 83 to 97 mol % of adipic acid and 3 to 17 mol % of phthalic acid, isophthalic acid and/or terephthalic acid. The use of other acids is described as disadvantageous, since relatively large amounts of other acids reduce adhesion.

In DE 100 22 280 and DE 100 22 276 A1 it is said that the polyester polyalcohols for producing the polyurethane must have functionalities of from 2 to 3 and OH numbers of from 40 to 400 mg KOH/g, where starting components used comprise adipic acid and/or phthalic anhydride, and also diols and/or triols. Diols/triols mentioned are: trimethylolpropane (TMP), neopentyl glycol, polytetrahydrofuran (PTHF), ethylene glycol, propylene-1,3-glycol, 1,5-pentanediol, 1,6-hexanediol, 1,4-butanediol, diethylene glycol, triethylene glycol, dipropylene glycol, tripropylene glycol, tetraethylene glycol and tetrapropylene glycol.

DE 199 28 608 A1 describes composite elements made of plastic with a polyisocyanate polyaddition product (PUR) adhering thereto, where the PUR formulation comprises a polyester polyalcohol of functionality from 2 to 3. The latter is based on a polycondensate of adipic acid and/or phthalic anhydride and also polytetrahydrofuran (PTHF), 1,6-hexanediol, 1,4-butanediol, monoethylene glycol, diethylene glycol (DEG), trimethylolpropane (TMP) and/or neopentyl glycol.

An object of the invention was therefore to provide composite elements which by virtue of their excellent mechanical properties can be used by way of example in automobile construction and which, even when exposed to mechanical load, do not lose the adhesion between the plastic and the polyisocyanate polyaddition products adhering thereto. The amount of polyester polyols should moreover be minimized since polyester polyols have an adverse effect on hydrolytic aging.

The adhesion between plastic and the polyisocyanate polyaddition products adhering thereto is determined here by a method based on DIN 53 357 A (the force being determined in accordance with the DIN 53357 A; this force per unit of composite element width being the adhesion (rolling peel resistance)).

The abovementioned object was achieved via the composite elements of the invention.

The invention provides composite elements comprising (a) thermoplastic with, adhering thereto, (b) the product of the reaction of a reaction mixture composed of (i) one or more isocyanates, (ii) one or more polyester polyols with functionality of from 2.5 to 3.5, preferably from 2.7 to 3.3, and a hydroxy number of from 40 to 400 mg KOH/g, preferably from 90 to 140 mg KOH/g, based on the condensation of succinic acid with diols with molar mass of from 62 to 200 g/mol, preferably from 62 to 150 g/mol and triols with molar mass of from 62 to 200 g/mol, preferably from 62 to 150 g/mol, (iii) one or more polyether polyols, and optionally (iv) chain extenders and/or crosslinking agents, optionally in the presence of (v) catalysts, (vi) blowing agents and/or (vii) auxiliaries and/or additives.

It is preferable that the total amount of the polyester polyols (ii) used is from 0.5 to 5% by weight, preferably from 1 to 4% by weight, based on the entirety of components (i) to (vii).

The composite elements of the invention can comprise, as thermoplastic (a), one or more of the usual thermoplastics, examples being acrylonitrile-butadiene-styrene (ABS), polymethyl methacrylate (PMMA), acrylonitrile-styrene acrylate (ASA), styrene-acrylonitrile (SAN), polycarbonate (PC), thermoplastic polyurethane (TPU), polyvinylchloride (PVC), thermoplastic polyolefins (TPO) (optionally post-crosslinked), examples being polyethylene and polypropylene, styrene-maleic anhydride copolymer (SMA) and blends thereof. The composite elements (a) preferably comprise thermoplastic PVC, particularly in the form of PVC foil.

The plastics (a) for producing the composite elements can be used in conventional form, for example in the form of foils, preferably with thickness of from 0.2 to 2 mm.

Foils of this type are available commercially, and are produced by well-known processes.

The composite elements can if necessary also have, on the side facing away from the thermoplastic (a), either a backing made of thermosets or thermoplastics, or a self-supporting injection molding, e.g. made of fiber-reinforced thermoplastics or thermosets. In industrial applications it is preferably to use backing materials made of polyurethane, polycarbonate/acrylonitrile-butadiene-styrene copolymers, polypropylene, and acrylonitrile-butadiene-styrene; these can optionally be fiber-reinforced materials, in particular glassfiber-reinforced.

The polyisocyanate polyaddition products (b) in the invention adhere to the plastic (a), and are by way of example polyurethanes which can optionally comprise isocyanurate structures and/or urea structures. Said polyisocyanate polyaddition products (b), preferably said polyurethanes, which can be compact or preferably cellular materials, particularly preferably open-cell materials, for example flexible foam, semi-rigid foam, or rigid foam, particularly preferably semi-rigid foam, are produced by the reaction of the appropriate components in the presence of the plastic (a).

Surprisingly, it has been found that improved adhesion between (a) thermoplastic and (b) the product of the reaction of a reaction mixture composed of (i) isocyanate, (ii) polyester polyalcohol, (iii) polyether polyols, and optionally (iv) chain extenders and/or crosslinking agents in the presence of, optionally, (v) catalysts, (vi) blowing agents and/or (vii) auxiliaries and/or additives, is achieved by using a polyester polyol (ii) with functionality of from 2.5 to 3.5, preferably 2.7 to 3.3 and with hydroxy number of from 40 to 400 mg KOH/g based on the condensation of succinic acid with low-molecular weight diols with molar mass of from 62 to 200 g/mol, preferably from 62 to 150 g/mol, and triols, with molar mass of from 62 to 200 g/mol, preferably from 62 to 150 g/mol.

When polyesters are used it is expected that the composite elements thus produced will fail because of the possibility of hydrolysis of the ester bond, in particular under moist, warm conditions, with separation of the composite. The polyester polyols used in the invention have low susceptibility to hydrolysis and even a small amount thereof increases adhesion. Amounts that are sufficient are preferably from 1 to 4% by weight, based on the entirety of the components (ii) to (vi) (polyol side of the reaction mixture).

The polyester polyols used in the invention are preferably based on condensation of succinic acid with monoethylene glycol, 1,2-propanediol, 1,4-butanediol, 1,6-hexanediol and 1,1,1-trimethylolpropane.

The polyester polyols are produced in a manner known to the person skilled in the art by polycondensation of succinic acid with diols and triols. Other compounds that can, of course, be used instead of or in addition to succinic acid are succinic acid derivatives, such as succinic anhydride and/or alkyl succinate. The polycondensation normally takes place in bulk, i.e. without solvent. It can, however, also take place in the presence of a solvent. A catalyst can be used to accelerate the polycondensation. The reaction can also be accelerated by applying vacuum. It can, however, also be carried out at atmospheric pressure, and in that case it is preferable to use an inert gas, such as nitrogen, for discharge of the resultant water of reaction and, respectively, the alkyl alcohols, particularly toward the end of the polycondensation.

The hydroxy number of the polyester polyol (ii) is adjusted via appropriate selection of the molar ratio of hydroxy groups from the diols and triols to the carboxy groups of the succinic acid, or the carboxy group equivalents when succinic acid derivatives are used. The functionality of the polyester polyol (ii) is adjusted via the proportion of triols in relation to the diols. By way of example, in the case of a one-molar batch (where the amount of the polyester polyol in the batch after removal of the cleavage products water or, where appropriate, alkyl alcohol is equal to the number-average molar mass), the functionality (F) of the polyester polyol (ii) is calculated by the following formula from the molar amount of 1,1,1-trimethylolpropane (TMP) used: $F=2+\text{moles of TMP}$.

The present invention also provides a process for producing the composite elements according to the invention comprising (a) a thermoplastic and adhering thereto, (b) a polyisocyanate polyaddition product, characterized in that the polyisocyanate polyaddition product is produced by reaction of a reaction mixture composed of
(i) one or more isocyanates,
(ii) one or more polyester polyols with functionality of from 2.5 to 3.5 and a hydroxy number of from 40 to 400 mg KOH/g based on the condensation of succinic acid with diols with molar mass of from 62 to 200 g/mol and triols with molar mass of from 62 to 200 g/mol,
(iii) one or more polyether polyols,
(iv) optionally chain extenders and/or crosslinking agents, optionally in the presence of
(v) catalysts,
(vi) blowing agents and/or
(vii) auxiliaries and/or additives
in the presence of (a).

The amounts reacted of the isocyanate (i) and of the compounds (ii) and (iii) that are reactive toward isocyanate, and also optionally (iv) to produce the composite elements of the invention can be such that the equivalence ratio of NCO groups from (i) to the entirety of the reactive hydrogen atoms from (ii) and (iii) and optionally (iv) is preferably from 0.3:1 to 1.8:1, particularly preferably from 0.8:1 to 1.2:1 and in particular from 0.9:1 to 1.1:1. If the reaction product (b) comprises at least some isocyanurate groups, it is usual to adjust to an equivalence ratio of NCO groups to the entirety of the reactive hydrogen atoms of from 1.5:1 to 60:1, preferably from 1.5:1 to 8:1. The reaction products (b) are usually produced by the known one-shot process or by the likewise known prepolymer process.

In the known prepolymer process, a prepolymer having isocyanate groups is usually produced in a first step from (i) isocyanate and from a substoichiometric amount, based on the functional NCO groups, of polyether polyol (iii), and said prepolymer is then reacted with the remaining components (ii) and optionally (iv), and optionally in the presence of (v) to (vii), to give the desired products.

The reaction to give the product can, by way of example, be carried out by use of manual casting, by use of high-pressure or low-pressure machines, or by use of RIM processes (reaction injection molding), usually in open, or preferably closed, molds. Suitable processing machines are obtainable commercially (e.g. from Isotherm, Hennecke, Kraus Maffei, inter alia).

The usual process, dependent on the particular application, mixes the starting components at a temperature of from 10 to 100° C., preferably from 20 to 60° C., and by way of example introduces them into the mold. The mixing process can by way of example be carried out on a laboratory scale by using a Pendraulik stirrer or on a larger scale by using conventional high-pressure mixing heads.

The reaction of the reaction mixture can by way of example be carried out in conventional, preferably temperature-controllable and sealable molds. The production of products with maximum smoothness in particular preferably uses molds whose surface has maximum smoothness or has defined ornamentation, and preferably has no unevenness, cracks, scratches or contamination. The surface of these molds can by way of example be pretreated by polishing.

Molds that can be used for producing the composite elements can be conventional and commercially available molds whose surface is composed by way of example of steel, aluminum, enamel, Teflon, epoxy resin or any other polymeric material, where the surface can optionally have been chromed, for example, hard-chromed. The molds should preferably be temperature-controllable, in order to permit adjustment to the preferred temperatures, and sealable, and be of a design appropriate for exerting pressure on the product. If the mold is under pressure, the pressure is normally reduced (e.g. by a preliminary unsealing stage and/or by controlled de-aeration) before the mold is opened.

The reaction to give polyisocyanate polyaddition products usually takes place at a mold temperature of from 20 to 220° C., preferably from 20 to 120° C., particularly preferably from 20 to 60° C. The reaction of the reaction mixture in the mold takes place in the invention in direct contact with the thermoplastic (a). In an example of a method for achieving this, (a) is placed in the mold before the reaction, and at this stage is preferably free from creases if it is a foil, and then the reaction mixture is charged to the mold, and the mold is then preferably sealed. In another known method, the foil (a) and optionally other components are first placed in the mold, and then the mold is sealed and then the liquid starting components are mixed and injected into the closed mold.

Isocyanates (i) that can be used are well known (cyclo) aliphatic and/or in particular aromatic polyisocyanates. Compounds particularly suitable for producing the composite elements of the invention are aromatic diisocyanates, preferably diphenylmethane diisocyanate (MDI) and tolylene diisocyanate (TDI), very particular preference being given to MDI. The isocyanates can be used in the form of the pure compound or in modified form, for example in the form of uretdiones, isocyanurates, allophanates or biurets, preferably in the form of reaction products that are known as isocyanate prepolymers and that comprise urethane groups and isocyanate groups.

It is possible to use, in addition to the polyester polyols (ii) used in the invention, other well-known polyether polyols as component (iii). They usually have molecular weights of from 300 to 15 000, in particular from 320 to 13 000, and preferably functionality of from 2 to 6.

The well known chain extenders and/or crosslinking agents can be used as component (iv). By way of example, these are diethanolamine, triethanolamine, diethyltolylenediamine, glycerol, 1,2-ethanediol, butanediol and isosorbide.

Catalysts (v) that can be used are conventional compounds which by way of example greatly accelerate the reaction of component (i) with components (ii) and (iii) and also optionally (iv). Examples of those that can be used are tertiary amines and/or organometallic compounds, in particular tin compounds. Compounds preferably used as catalysts are those which lead to minimum fogging, i.e. to minimum emission of volatile compounds form the reaction product (b), for example potassium acetate and/or Li salts and/or tertiary amines having at least one functional hydroxy group.

Examples of blowing agents (vi) that can be used for producing foamed products (b), such as flexible polyurethane foams, semi-rigid foams, or rigid foams, which optionally can comprise urea and/or isocyanurate structures, are well known compounds having chemical or physical action. Water can preferably be used as blowing agent having chemical action, and forms carbon dioxide by reaction with the isocyanate groups. Examples of physical blowing agents, i.e. inert compounds of the type that evaporate under the conditions of polyurethane formation, are by way of example (cyclo)aliphatic hydrocarbons, preferably those having 4 to 8, preferably from 4 to 6 and in particular 5 carbon atoms, partially halogenated hydrocarbons, or ethers, ketones or acetates. However, it is also possible to use carbon dioxide ($CO_2$), which by way of example is added to at least one of the starting materials (i), (ii), (iii), (iv), (v) and (vii) as far as the limit of its chemical-physical solubility. The amount of the blowing agents used depends on the desired density of the foams. The various blowing agents can be used individually or in any desired mixtures with one another.

The reaction is optionally carried out in the presence of (vii) auxiliaries and/or additives, e.g. fillers, fibers, e.g. in the form of textiles and/or mats, cell regulators, surfactant compounds and/or stabilizers to counter oxidative, thermal or microbial degradation or aging.

By virtue of the use of the polyester polyols (ii), the composite elements of the invention in particular have markedly improved adhesion between (a) and (b). The adhesion to (a), which often functions as backing material, is particularly good when plasticized PVC is used. Adhesion of at least 0.35 N/mm, measured by a method based on that used for DIN 53357-A values, was achieved in the invention through use of the polyester polyols used in the invention. The standardization of the force in accordance with DIN 53357-A to one unit of width of 1 mm of the foam strips was carried out in order to improve comparability of the measurements, in particular when specimens of different widths were used. For the purposes of this application, specimens of width 20 mm were produced and tested.

The present invention also provides the use of the composite elements of the invention in components in vehicle construction and aircraft construction, and in the construction industry, for example as dashboards, door cladding, parcel shelves, consoles, armrests, automobile seats, headrests, roof linings, or door mirrors.

The invention will be explained in more detail by using the examples below.

EXAMPLES

Analyses methods were as follows:
Dynamic viscosity: using a MCR 51 rheometer from Anton Paar in accordance with DIN 53019 with a CP 50-1 cone (diameter 50 mm, angle 1°) at shear rates of 25, 100, 200, and 500 $s^{-1}$.
Hydroxy number: method based on the DIN 53240 standard
Acid number: method based on the DIN 53402 standard
Separation force: method based on the DIN 53 357-A standard Key to materials and abbreviations used:
PET A: Glycerol-started polyether polyol having terminal ethylene oxide block (14% by weight) with OH number of 35 mg KOH/g and with nominal functionality of 3.
PET B: Glycerol-started polyether polyol having terminal ethylene oxide block (19% by weight) with OH number of 35 mg KOH/g and with nominal functionality of 3.
PET C: Ethylenediamine-started polypropylene oxide with OH number of 630 KOH/g and with nominal functionality of 4.
SAN polyol: Hyperlite® Polyol 1650; polyether polyol with solids content of about 42% by weight of styrene-acrylonitrile copolymer and with hydroxy number of about 20 mg KOH/g from Bayer MaterialScience AG.
Carbon black: ISOPUR® N black paste from iSL-Chemie.
Diethyltolylene-diamine: From Albemarle.
Jeffcat ZF10: Incorporable catalyst from Huntsman; N,N,N'-trimethyl-N'-hydroxyethyl-bisaminoethyl ether.
Dabco NE-1070: N-[3-(dimethylamino)propyl)urea from Air Products.
Isocyanate: Diphenylmethane diisocyanate mixture from Bayer MaterialScience AG with NCO content of 32% by weight of NCO, comprising from 0.05 to 0.5% by weight of 2,2'-MDI, from 5.5 to 7.5% by weight of 2,4'-MDI, from 50 to 54% by weight of 4,4'-MDI, and also higher MDI homologs.
Foil used comprised a skin produced by the slush process and based on DSY 260/02 PVC powder from Arkema.

A) Synthesis of the Polyester Polyols Used as Adhesion Promoters:

Succinic acid, monoethylene glycol, 1,2-propanediol, 1,6-hexanediol, and 1,1,1-trimethylolpropane were used as initial charge under a blanket of nitrogen in a 6-liter four-necked flask equipped with heating mantle, mechanical stirrer, internal thermometer, 40 cm packed column, column head, descending high-performance condenser, and also membrane vacuum pump, and were heated to 200° C. with slow stirring, whereupon water of reaction was removed by distillation. After 5 hours, the pressure was reduced continuously over a period of 6 hours to a final value of 15 mbar, and the reaction was completed as far as a total reaction time of 30 hours. Table 1 below shows the quantities and data.

TABLE 1

Analysis data for the polyester polyols produced

| | | Polyester polyol | |
|---|---|---|---|
| | | A 1 (comp) | A-2 |
| Polycarboxylic acids: | | | |
| Adipic acid | [pts. by wt.] | 63.81 | |
| Succinic acid | [pts. by wt.] | | 65.42 |
| Polyalcohols: | | | |
| Ethylene glycol | [pts. by wt.] | | 6.30 |
| 1,2-Propanediol | [pts. by wt.] | 14.45 | 27.89 |
| 1,6-Hexanediol | [pts. by wt.] | 27.56 | 12.00 |
| 1,1,1-Trimethylolpropane | [pts. by wt.] | 9.91 | 8.34 |
| Total | [pts. by wt.] | 115.72 | 119.94 |
| Water removed | [pts. by wt.] | −15.72 | −19.94 |
| Data: | | | |
| OH number, found | [mg KOH/g] | 109 | 110.5 |
| Acid number, found | [mg KOH/g] | 0.5 | 0.33 |
| Functionality | | 3.2 | 2.8 |

B) Production of the Composite Elements

The composite elements were produced at a mold temperature of 45° C. in an aluminum mold measuring 200×200×20 mm which had a lining of Teflon foil and which could be sealed with a lid. A PVC foil (200×200×1.2 mm) was placed on the floor of the mold. The temperature of both components (polyol component and isocyanate component) was 23° C. The components of the polyol side were first mixed with a Pendraulic stirrer in a paper cup, and then the isocyanate was added and the mixture was mixed for about 10 seconds. The mixture was then poured into the open mold and this was sealed, the amount of reacting melt having been selected so as to give an average envelope density of 120 g/l for the foam. After about 10 minutes, the material was demolded and the composite element was stored at room temperature for 24 hours. Strips of width 20 mm were then cut from the material. The adhesion properties (adhesion between PVC foil and polyurethane) of said strips were then tested.

TABLE 2

Formulations and properties of the composite elements

| | | Example | |
|---|---|---|---|
| | | B-1 (comp) | B-2 |
| Polyol side: | | | |
| PET A | [pts. by wt.] | 30.4 | 30.4 |
| PET B | [pts. by wt.] | 55 | 55 |
| PET C | [pts. by wt.] | 2 | 2 |
| Styrene-acrylonitrile copolymer | [pts. by wt.] | 3.35 | 3.35 |
| Carbon black | [pts. by wt.] | 0.1 | 0.1 |
| Diethyltoluenediamine | [pts. by wt.] | 0.95 | 0.95 |
| Water | [pts. by wt.] | 2.1 | 2.1 |
| Polyester polyol A-1 (comp) | [pts. by wt.] | 5 | |
| Polyester polyol A-2 | [pts. by wt.] | | 3 |
| Jeffcat ZF10 | [pts. by wt.] | 0.2 | 0.2 |
| Dabco NE1070 | [pts. by wt.] | 0.9 | 0.9 |
| Isocyanate side: | | | |
| Isocyanate | [pts. by wt.] | 42.64 | 42.17 |
| Rolling peel resistance (adhesion between PVC foil and PUR) by method based on DIN 53 357-A (measured on specimens of width 2 cm) | [N/mm] | 0.18 | 0.52 |

Separation force is determined in newtons. In order to improve comparability between specimens of different width, values have been standardized to a strip width of 1 mm by dividing the force observed by the width of the strips in mm.

The formulation used in example B-2 differs from the formulation used in comparative example B-1 only in the nature of the polyester polyol used and in the amount used of the polyester polyol.

The table shows that use of only 3 parts by weight of the polyester polyol used in the invention achieves markedly better adhesion values than use of 5 parts by weight of the conventional polyester polyol used.

What is claimed is:

1. A composite element comprising (a) a thermoplastic selected from the group consisting of acrylonitrile-butadiene-styrene (ABS), polymethyl methacrylate (PMMA), acrylonitrile-styrene acrylate (ASA), styrene-acrylonitrile (SAN), polycarbonate (PC), thermoplastic polyurethane (TPU), polyvinylchloride (PVC), thermoplastic polyolefins (TPO), styrene-maleic anhydride copolymer (SMA), and blends thereof with, adhering thereto, (b) a polyisocyanate polyaddition product formed from a reaction mixture comprising
   (i) one or more aromatic isocyanates selected from the group consisting of diphenylmethane diisocyanate (MDI), tolylene diisocyanate (TDI), MDI and TDI in modified form, and in the form of isocyanate prepolymers comprising urethane groups and isocyanate groups,
   (ii) one or more polyester polyols with functionality of from 2.5 to 3.5 and a hydroxy number of from 40 to 400 mg KOH/g based on the condensation of succinic acid with a diol with molar mass of from 62 to 200 g/mol and a triol with molar mass of from 62 to 200 g/mol, wherein the quantitative proportions of the polyester polyols are from 0.5 to 5% by weight based on the entirety of components (i) to (vii),
   (iii) one or more polyether polyols, and
   (iv) optionally a chain extender and/or a crosslinking agent,
   in the presence of
   (v) optionally a catalyst,
   (vi) a blowing agent and
   (vii) optionally an auxiliaries and/or an additive.

2. The composite element as claimed in claim 1, wherein the polyester polyol is a condensate of succinic acid with one or more diols selected from the group consisting of monoethylene glycol, 1,2-propanediol, 1,4-butanediol and 1,6-hexanediol and triols with molar mass of from 62 to 200 g/mol.

3. The composite element as claimed in claim 1, wherein the polyester polyol is a condensate of succinic acid with 1,2-propanediol and with one or more diols selected from the group consisting of monoethylene glycol, 1,4-butanediol and 1,6-hexanediol and triols with molar mass of from 62 to 200 g/mol.

4. The composite element as claimed in claim 1, wherein the triol is trimethylolpropane.

5. The composite element as claimed in claim 1, wherein the polyester polyol is based on the condensation of succinic acid with monoethylene glycol, 1,2-propanediol, 1,6-hexanediol and 1,1,1-trimethylolpropane.

6. The composite element as claimed in claim 1, wherein the hydroxy number of the polyester polyol (ii) is from 90 to 140 mg KOH/g.

7. The composite element as claimed in claim 1 with an adhesion of at least 0.35 N/mm of composite element width measured by a method based on DIN 53 357 A; between the thermoplastic (a) and the product (b).

8. A component in vehicle construction or in aircraft construction or in the construction industry comprising the composite element as claimed in claim 1.

9. The composite element as claimed in claim 1, wherein the quantitative proportions of the polyester polyol are from 1 to 4% by weight based on the entirety of components (i) to (vii).

10. A process for producing the composite element as claimed in claim 1 comprising adhering a thermoplastic (a) to a polyisocyanate polyaddition product (b), wherein the polyisocyanate polyaddition product is produced by reaction of a reaction mixture comprising
- (i) one or more isocyanates,
- (ii) one or more polyester polyols with functionality of from 2.5 to 3.5 and a hydroxy number of from 40 to 400 mg KOH/g based on the condensation of succinic acid with a diol with molar mass of from 62 to 200 g/mol and a triol with molar mass of from 62 to 200 g/mol, wherein the quantitative proportions of the polyester polyols are from 0.5 to 5% by weight based on the entirety of components (i) to (vii),
- (iii) one or more polyether polyols,
- (iv) optionally a chain extender and/or a crosslinking agent, in the presence of
- (v) optionally a catalyst,
- (vi) a blowing agent and
- (vii) optionally an auxiliary and/or an additives in the presence of (a).

* * * * *